US009878803B2

(12) United States Patent
Frankenberger

(10) Patent No.: US 9,878,803 B2
(45) Date of Patent: Jan. 30, 2018

(54) INTERACTIVE SYSTEM AND METHOD FOR INTEGRAL EMERGENCY UNLOCKING OF A LOCKED COCKPIT DOOR ON AN AIRPLANE

(71) Applicant: Airbus DS GmbH, Taufkirchen (DE)

(72) Inventor: Harald Frankenberger, Ottobrunn (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 15/270,104

(22) Filed: Sep. 20, 2016

(65) Prior Publication Data
US 2017/0081042 A1 Mar. 23, 2017

(30) Foreign Application Priority Data
Sep. 23, 2015 (DE) .......................... 10 2015 012 173

(51) Int. Cl.
*B64D 45/00* (2006.01)
*B64C 1/14* (2006.01)
*G06K 9/00* (2006.01)
*G08C 17/02* (2006.01)

(52) U.S. Cl.
CPC ........ *B64D 45/0015* (2013.01); *B64C 1/1469* (2013.01); *G06K 9/00832* (2013.01); *B64D 2045/0035* (2013.01); *G08C 17/02* (2013.01)

(58) Field of Classification Search
CPC .......... B64C 1/1469; B64D 2045/0035; B64D 45/0015; G07C 9/00563
See application file for complete search history.

(56) References Cited

U.S. PATENT DOCUMENTS

| 6,677,844 B1* | 1/2004 | Gorospe | ................... H01F 7/16 335/220 |
| 2002/0107694 A1* | 8/2002 | Lerg | ........................ B60C 23/06 704/273 |
| 2003/0169184 A1* | 9/2003 | Manten | ................. B64C 1/1469 340/945 |

(Continued)

FOREIGN PATENT DOCUMENTS

| DE | 19732806 | 2/1999 |
| DE | 10145261 | 4/2003 |

OTHER PUBLICATIONS

German Search Report, Jul. 19, 2016, priority document.

*Primary Examiner* — Thomas Alunkal
(74) *Attorney, Agent, or Firm* — Greer, Burns & Crain Ltd.

(57) ABSTRACT

An interactive system for unlocking a locked airplane cockpit door having at least one ground station and at least one system for transmitting data between the ground station and airplane, including a ground station signal for actuating a door unlock mechanism. The airplane has: a passenger cabin located door unlock request unit to generate a door unlock request signal; a unit to transmit the request signal; at least one image capture unit in the passenger cabin or a cockpit and a unit to transmit images; a unit for receiving a door unlock signal; and an on-board computer, configured to receive the door unlock signal from the receiving unit and activate the door unlock mechanism. The ground station is connected to at least one receiving station for door unlock request and image signals transmitted from airplanes and is provided with or connected to a transmitting unit for door unlock signals.

14 Claims, 2 Drawing Sheets

(56) References Cited

U.S. PATENT DOCUMENTS

| | | | | |
|---|---|---|---|---|
| 2004/0094667 A1* | 5/2004 | D'Alvia | ............... | B64C 1/1469 |
| | | | | 244/118.5 |
| 2005/0082429 A1* | 4/2005 | D'Alvia | ............... | B64C 1/1469 |
| | | | | 244/118.5 |
| 2011/0273269 A1* | 11/2011 | Pujol | ................... | B64C 1/1407 |
| | | | | 340/6.1 |
| 2017/0043881 A1* | 2/2017 | Fleck | ................... | B64C 1/1469 |

* cited by examiner

INTERACTIVE SYSTEM AND METHOD FOR INTEGRAL EMERGENCY UNLOCKING OF A LOCKED COCKPIT DOOR ON AN AIRPLANE

CROSS-REFERENCES TO RELATED APPLICATIONS

This application claims the benefit of the German patent application No. 10 2015 012 173.1 filed on Sep. 23, 2015, the entire disclosures of which are incorporated herein by way of reference.

TECHNICAL FIELD

The present invention relates to an interactive system for integral emergency unlocking of a locked cockpit door of an airplane. It also relates to a method for integral emergency unlocking of a locked cockpit door on an airplane. The interactive system according to the invention is designed and provided in particular for carrying out the method according to the invention.

BACKGROUND OF THE INVENTION

For safety reasons and in particular to protect the pilot from attacks from the area of the passenger cabin, the cockpit door between the passenger cabin and the cockpit is designed to be unbreakable and bulletproof and can be opened only from the cockpit side during flight. There is the option of sending an open request from the passenger cabin to the cockpit, but if the cockpit crew does not or cannot respond to this request, then it is impossible for anyone to access the cockpit from the passenger cabin in an emergency. The scenario on which the invention is based is thus that an authorized crew member of the airplane is standing in front of the locked cockpit door and cannot open it in the traditional way, i.e., the authorized crew member is prevented or denied access to the cockpit without adequate reason. The authorized crew member thus has the well-founded suspicion that an emergency or a criminal act is underway.

The interactive system and method according to the invention should serve to allow opening of a locked cockpit door of an airplane in flight in an emergency, even from outside the cockpit, although only by an authorized person, and this is possible even if the pilot is currently denying access to the cockpit or cannot grant access because of a health impairment.

It is known from DE 101 45 261 A1 that a cockpit door can be opened by means of a radio signal, preferably encrypted, from air traffic control or air navigation services.

It is known from DE 197 32 806 A1 that the passenger cabin can be monitored from the cockpit by means of video cameras. The image data from these monitoring cameras can also be transferred automatically to a ground station, for example, an air control tower, in certain situations.

SUMMARY OF THE INVENTION

An object of the present invention is to provide a generic interactive system and a generic method for unlocking a locked cockpit door on an airplane that will make it possible in an emergency to unlock and open the cockpit door from the passenger cabin of the airplane without thereby endangering the safety of the cockpit crew in the event of the presence of potential airplane hijackers in the passenger cabin. This means that, in the latter case, unlocking by the interactive system and/or the method must be precluded.

The interactive system according to the invention for unlocking a locked cockpit door of an airplane comprises at least one ground station and at least one data transmission system between the ground station and at least one airplane, such that a signal can be transmitted from the ground station to the airplane for activation of a door unlock mechanism for the cockpit door. The airplane has a door unlock request unit, which is provided in the passenger cabin of the airplane for generating a door unlock request signal and a signal transmitting unit for the door unlock request signal. Furthermore, the airplane is equipped with at least one image capture unit in the passenger cabin and/or in the cockpit of the airplane and an image transmitting unit for transmitting detected images to the ground station. In addition, the airplane has a receiving unit for receiving a door unlock signal and an on-board computer designed to receive the door unlock signal from the receiving unit and to activate the door unlock mechanism of the cockpit door. The at least one ground station is provided with or connected to at least one receiving station for door unlock request signals and image signals emitted by airplane and provided with or connected to at least one transmitting unit for door unlock signals.

This interactive system according to the invention makes it possible to reliably and safely open a locked cockpit door in an airplane in an emergency from outside of the cockpit by authorized persons and only such persons even if the current airplane pilot is refusing to grant access or cannot grant access for health reasons.

The door unlock request unit, the signal transmitting unit, the at least one image capture unit, the image transmitting unit, the receiving unit for receiving a door unlock signal, the on-board computer responsible for unlocking the cockpit door and the door unlock mechanism are preferably designed so that they cannot be switched off or at least cannot be switched off from the cockpit.

In a preferred refinement of the invention, the data transmission system has a satellite network between the ground station and the airplane.

It is also advantageous if the data transmission system between the ground station and the airplane is autonomous and independent of other communications equipment between the airplane and ground.

A particularly preferred specific embodiment of the interactive system according to the invention is characterized in that the door unlock request unit has an input device for inputting a personal authentication key into the on-board computer of the airplane responsible for unlocking the cockpit door; the on-board computer responsible for unlocking the cockpit door is designed to authenticate a received signed door unlock signal; and the at least one ground station is equipped with a verification unit for the received door unlock request signals and with a generating and signature unit for door unlock signals.

This method according to the invention for unlocking a locked cockpit door of an airplane, wherein the cockpit door delineating the cockpit from the passenger cabin is unlocked on the basis of an unlock signal emitted by a ground station, comprises the following steps:

a) Inputting a personal authentication key comprising a passphrase and a secret key into an input device in the passenger cabin by means of a first crew member of the airplane crew, wherein the authentication key that has been input is sent to an on-board computer of the airplane, which is responsible for unlocking the cockpit door, and whereby an image transfer command is triggered;

b) Transmitting the recorded images and/or live images recorded or being recorded by at least one image capture unit in the passenger cabin and/or in the cockpit of the airplane to a ground station;

c) Transmitting a door unlock request signal containing a personal identification code of the first crew member from the passenger cabin to the ground station;

d) Verifying the personal identification code, the transmitted images and flight information data in the ground station for deviations from target values;

e) If no deviations from target values are found, generating an authenticated door unlock signal using a public key stored in a memory in the ground station for the first crew member and a secret key of the ground station as signatures for the door unlock signal;

f) Sending the signed door unlock signal from the ground station to the airplane and receiving the signed door unlock signal by a receiver of the airplane;

g) Forwarding the signed door unlock signal from the receiver in the airplane to the on-board computer responsible for unlocking the cockpit door in the airplane;

h) Verifying the signatures of the signed door unlock signal, namely using the secret key of the first crew member with the personal authentication key input in step a), and using the public key of the ground station stored on board the airplane;

i) Unlocking and opening the cockpit door, unless or as long as verification of the signatures of the door unlock signal has not revealed an error;

Due to the sequence of the method steps according to the invention and providing authentications, the cockpit door can be unlocked and opened only by authorized personnel and only in an emergency confirmed and verified by the ground station. This makes it possible to reliably counteract a health-related unavailability of the pilot or an intentional criminal act by a crew member or even hijacking of an airplane due to seizure of the cockpit by non-crew members. An interactive system according to the invention implementing the method according to the invention fulfills very high demands regarding the availability as well as the integrity and the required safety.

Preferably, a personal authentication key must be entered additionally in step a) by at least one additional crew member of the airplane crew, wherein the personal identification code of the additional crew member is also transmitted in step c) from the passenger cabin to the ground station, wherein the signed door unlock signal is generated in step e) also using the authentication key of the additional crew member and wherein the personal authentication key of the additional crew member is also verified in step h). This further increases the security of the entire process.

In step d) the ground station preferably additionally makes a verbal query of the current pilot of the airplane for status information.

It is also advantageous if the signed door unlock signal is sent from the ground station in step f) as a radio signal at a standardized frequency, so that the signed door unlock signal is received by all airplanes in the reception area equipped with a suitable receiver.

Preferred exemplary embodiments of the invention with additional design details and additional advantages are described and explained in greater detail below with reference to the accompanying drawings.

DETAILED DESCRIPTION OF THE PREFERRED EMBODIMENTS

Figure 1:
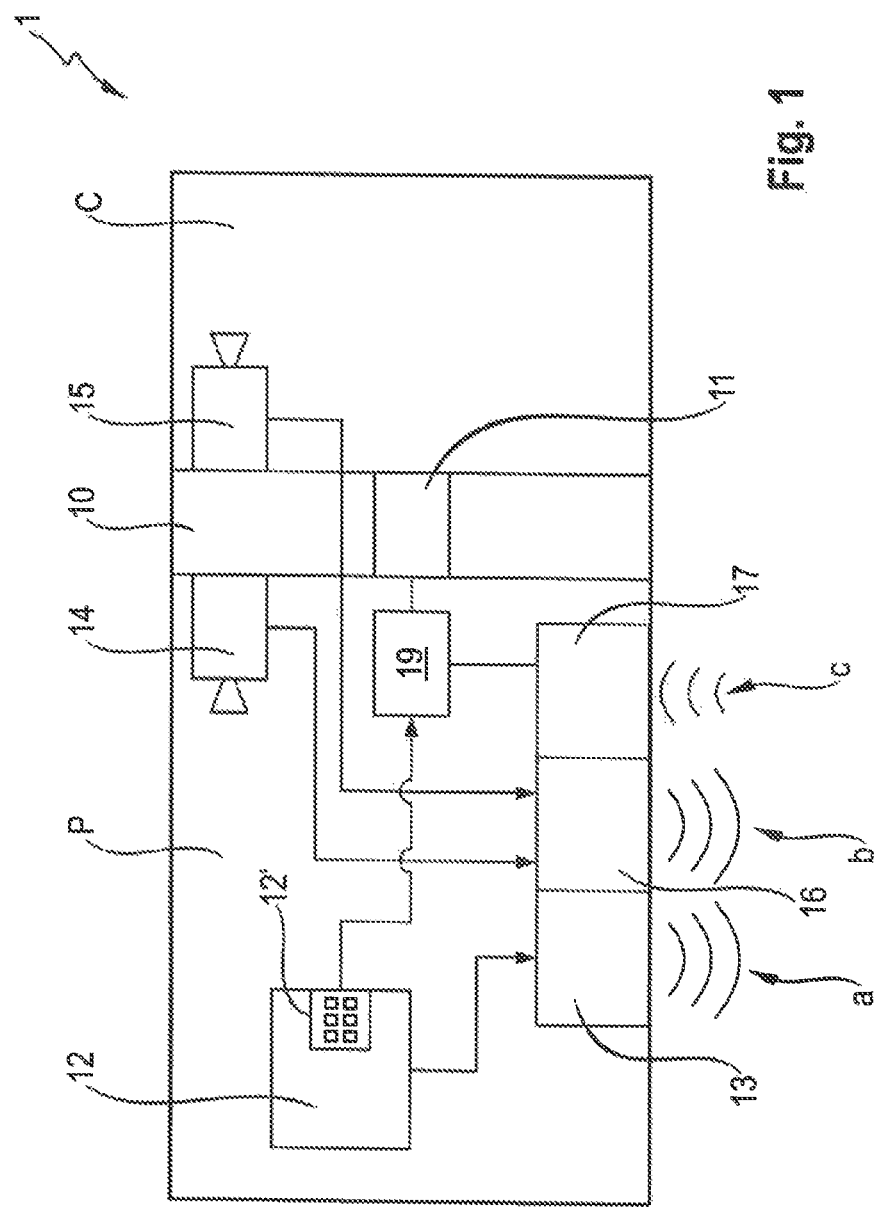
FIG. 1 shows a schematic diagram of the interactive system according to the invention.

FIG. 1 shows schematically a detail of an airplane 1 having a cockpit C and a passenger cabin P, separated from one another by a cockpit door 10. The cockpit door 10 can be opened only from the cockpit side during flight operation.

A door unlock request unit 12 for generating a door unlock request signal is provided in the passenger cabin P. The door unlock request unit is therefore equipped with an input device 12' for inputting a personal authentication key of a crew member operating the input device and thereby making an emergency call.

This personal identification key may be stored on a chip card or on a suitable RFID transponder, which could even be implanted. Each crew member of the airplane 1 or a suitable subset of the airplane crew can be equipped with such an individual personal authentication key. The chip card or the RFID transponder contains the secret personal authentication key (SK-1) for decryption; this secret key is saved using a passphrase. One example of such a key is a so-called "secret key" according to the known principle of the public key method. Since such a personal authentication key is person-specific, it contains or forms at the same time a personal identification code of the owner of the key. In this case, the input device 12' may be designed as or may include a reader, preferably an almost indestructible reader for corresponding chip cards or RFID transponders.

The input personal authentication key is forwarded by the input device 12' to an on-board computer 19 of the airplane 1, which is responsible for unlocking the cockpit door 10. For this purpose, the on-board computer 19 responsible for unlocking the cockpit door 10 is connected to a door unlock mechanism 11 of the cockpit door 10. The door unlock request device 12 is also connected to a signaling unit 13 of the airplane 1 in order to forward a door unlock request signal a, triggered by input of the personal authentication key and the activation of the input device to the signal sending unit 13 for transmission to a ground station 2. The door unlock request signal a is sent to a ground station from there.

An image capture unit 14, which is formed by a video camera, for example, is provided in the passenger cabin P and detects the space in front of the cockpit door 10. Additional image capture units (not shown) may also be provided. The image signal detected by the image capture device 14 (and optionally by the additional image capture devices) is sent to an image transmitting unit 16 of the airplane 1. At least one image capture unit 15 is also provided in the cockpit C, its image signal also being sent to the image transmitting unit 16 for transmission to the ground station 2. The image capture devices 14, 15 may be cameras for monitoring the passenger cabin and the cockpit or may include such cameras that are equipped with or connected to memory media on board the airplane and that record continuously. The recorded image material is stored for a predefinable period of time before it can be overwritten. This makes it possible to also transmit the stored image data from the past to the ground station 2. After input of the personal authentication key and confirmation of the input device, the saved and current image signals b are automatically sent from the image transmitting unit 16 to the ground station 2.

The design and functioning of the interactive system according to the invention will now be described with reference to the diagram in FIG. 2.

Figure 2:
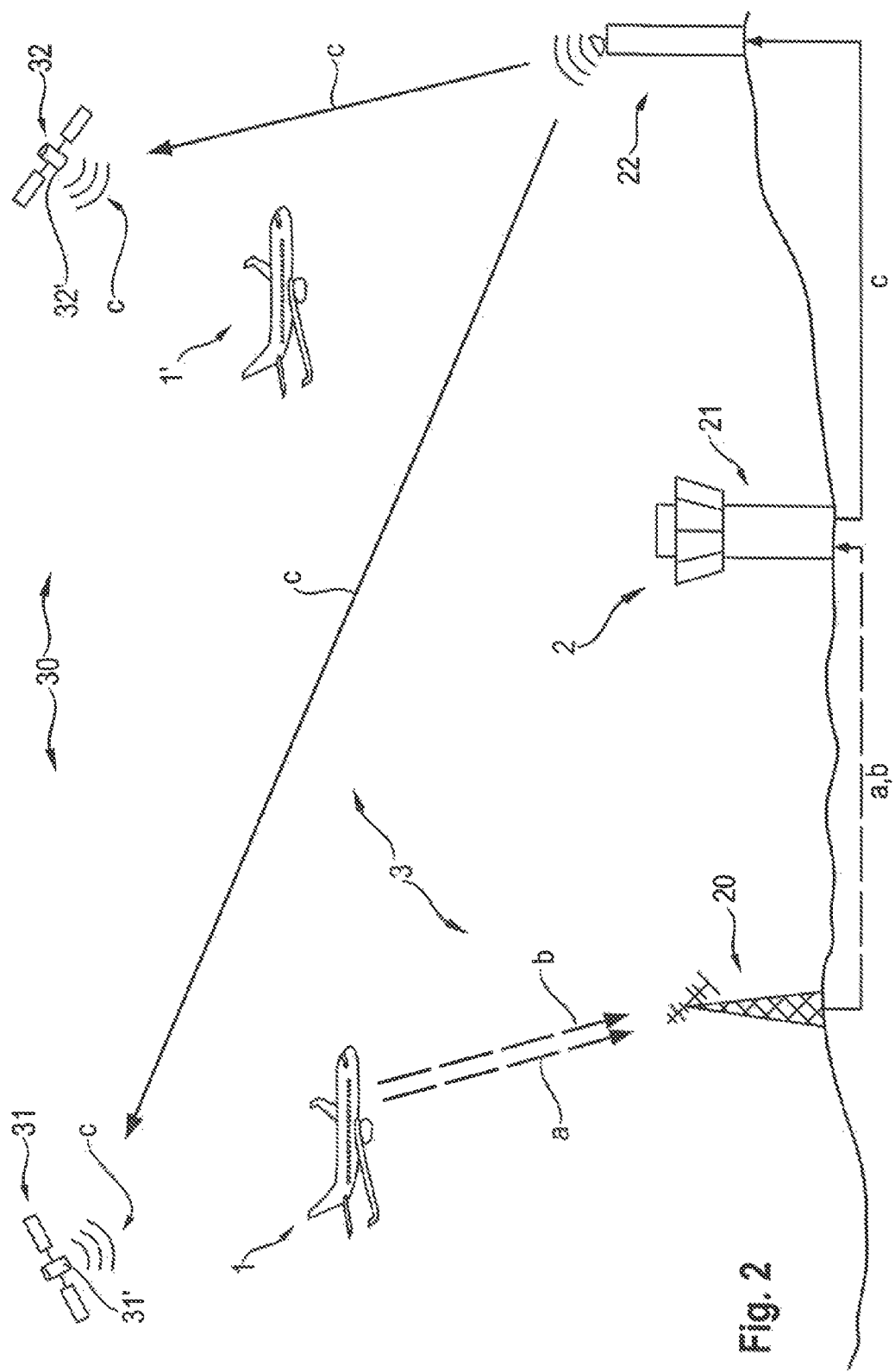
FIG. 2 shows a usage diagram of an interactive system according to the invention.

The ground station 2 has a network of receiving stations, preferably a global network, only one receiving station 20 of which is illustrated in FIG. 2. The signals (door unlock request signal a and image signals b) received by the receiving station 20 are forwarded to a command central 21 at the ground station 2.

The door unlock request signal a and at least one image signal b are thus sent to the receiving station 20 of ground station 2 by the airplane 1 triggering the emergency call. This signal transmission can take place, for example, over a shortwave transmitter-receiver system, which is either independent of the aeronautical radio hardware or utilizes the aeronautical radio hardware. These signals may be encrypted, but encryption is not absolutely necessary for this transmission.

The received door unlock request signal a is analyzed in command central 21, and the personal identification code of the crew member that has triggered the door unlock request contained therein is verified at least for whether this identification code is valid and belongs to a current crew member of the airplane 1. In the case of the public key method, the respective so-called "public key," called PK-1 here, is used for this purpose. In addition, the images of the received image signals are checked for whether there are any detectable irregularities in the cockpit C and/or in the passenger cabin P (for example, a threat to a crew member) that might prevent opening of the cockpit door 10. In addition, generally available flight information data is checked for whether the airplane 1 is deviating or has already deviated from the intended course for the intended flight altitude.

If no suspicious events that would prevent the door from being unlocked are detected on board the airplane 1 in command center 21, then a door unlock signal c is generated and sent over a transmitting unit 22 connected to the ground station 2 or belonging to the ground station 2 and part of a preferably global network of transmitting units. Then the door unlock signal c is emitted by this transmitting unit 22 (or by a plurality of transmitting units of the network) and can be received by the receiving unit 17 of the airplane 1. In the example shown here, the door unlock signal c here is transmitted by the transmitting unit 22 over a network of satellites 31, 32, from whence the door unlock signal c is sent to all airplanes 1, 1' that are within the receiving range of the transmitters 31', 32' of the satellites 31, 32. In order for the door unlock signal c to manifest an effect only in the airplane 1 from which the emergency call was sent, it is provided that signal c is authenticated as described below.

Executable software is stored on a computer in ground station 2, generating an authenticated door unlock signal c. To do so, the known public key (PK-1) of the crew member sending the emergency call is used on board the airplane 1 to limit the door unlock signal c to this airplane 1. In addition, a secret key (SK-2) assigned to ground station 2 is used for authentication to generate the authenticated door unlock signal c. The public keys (PK-2) belonging to the secret keys (SK-2) of all ground stations 2 belonging to the interactive system according to the invention are stored in a memory assigned to the respective on-board computer 19 of the airplanes 1, 1' participating in the interactive system according to the invention.

Consequently, a system of satellites 31, 32, including the respective relay stations for the uplink (transmitting units 22), possibly supplemented by additional transmitting stations (not shown) on the ground will receive the authenticated door unlock signal c from an authorized command central 21, this signal then being emitted with sufficient frequency at least within the reception area of the airplane 1. The requests to this satellite system include, among other things a very high availability and a very high assurance of authenticity of the messages transmitted (integrity request). For example, it may be a global navigation system (GNSS system), such as the Galileo system using the ERIS channel or a satellite-based navigation supplement system (SBAS system) using one of the message types 8, 11, 13 to 16 or 19 to 23 reserved for future applications or corresponding message types provided for the current L5-SBAS.

The receiving units 17 of the airplanes 1, 1' participating in the interactive system according to the invention are equipped with a receiver, which receives the signal emitted by the satellites 31, 32 and optionally also emitted by transmitting stations on the ground and forwarded to the on-board computer 19 responsible for the cockpit door 10. In the case of the Galileo system, the receiver may be an ERIS-capable Galileo receiver, for example, which can process the door unlock signal c. In an SBAS system, the receiver may be an SBAS receiver, for example, which can process the received message containing the door unlock signal c.

Executable software is stored in the on-board computer 19, verifying the validity and authenticity of the received door unlock signal in the on-board computer 19 on the basis of the personal key (SK-1) loaded and the stored public key (PK-2) of the ground station 2 and then unlocking and opening the cockpit door 10 if the validity and authenticity of the keys are verified.

The public keys (PK-1) of all crew members of the airplanes 1, 1' connected to the emergency system according to the invention together with their identification codes for unambiguous identification of the persons are stored in at least one memory unit of the ground station 2. Information about the at least one command central 21 of the ground station 2 is thus either known to them or can be made known to them at any time within a sufficiently short period of time.

The request of a door unlock request signal preferably takes place with the steps described below:

A first and optionally an additional crew member will load their respective personal (secret) keys (SK-1) into the on-board computer 19 that is relevant for the cockpit door by entering their respective passphrase via the reader of the input device 12'. These persons are regarded as the initiators of the emergency call. Loading a personal key into the on-board computer 19 also leads to automatic encrypted transmission of the images, recorded by the image capture units 14, 15, of the passenger cabin monitoring and the cockpit monitoring to the receiving stations 20 of the ground station 2. After preprocessing, these stations forward the information to the command central 21.

In addition, the door unlock request signal and the personnel identification code of the (respective) initiator of the emergency call are transmitted to ground station 2. This can take place automatically or via voice radio. For example, one crew member of airplane 1 contacts the ground station 2 on an intended communication link. In doing so, all the initiators are specified and the door unlock procedure is initiated.

The command central 21 of the ground station carries out suitable measures for verifying the legal validity and for justifying the door unlock request, for example:

(a) Analysis of the image material of the cabin and cockpit monitoring to rule out or detect any foreign influences, so that, for example, a coerced door unlock request can be detected;

(b) Observing the flight path of the airplane to detect any irregularities;

(c) Calling the current airplane pilot to explain the reason for refusing cockpit access.

These measures for verifying the legality and justification of the door unlock request can also be carried out automatically.

If the verification does not reveal any irregularities, i.e., no deviations from the target values, then an authenticated door unlock signal c is generated, which may be initiated automatically or manually. The authorized personnel in command central 21, for example, initiates this generation of the authenticated door unlock signal c. In doing so, the public keys (PK-1) of all initiators on board the airplane 1 and the secret keys (SK-2) of the ground station are used for the authentication of the door unlock signal c.

This authenticated door unlock signal c is sent to the corresponding relay stations such as the transmitting unit 22 for the uplink, which then transmits it to the corresponding satellite(s) 31, 32 of the satellite system. From there, it is often distributed adequately.

The respective receivers in the receiving units 17 of all airplanes 1, 1' in the reception area belonging to the interactive system according to the invention will receive the authenticated door unlock signal c and forward it to the respective on-board computer 19 assigned to the cockpit door 10. The on-board computer 19 will attempt to verify the door unlock signal. However, only the on-board computer 19 of the airplane 1 from which the emergency call has been transmitted is capable of doing so, because that computer knows the personal keys of the initiators required for decryption. Through the verified signature of the door unlock signal, the integrity of the door unlock command is ensured. It is therefore certain that the door being unlocked is the cockpit door in the correct airplane 1. The integrity of the door unlock request is supported by the required input of the passphrase of at least one crew member and by other measures taken in the ground station 2, such as, for example, the exclusion of foreign influences, observation of a flight path that deviates from the intended flight path filed by ground station or the lack of response of the current airplane pilot to personal calls from the ground station 2.

In summary, the interactive system according to the invention forms a security system, which has the result that a locked cockpit door on an airplane can be opened in an emergency from outside of the cockpit by authorized persons or devices, even if the current airplane pilot cannot grant access or has actively refused access. This opening of the door can be performed only by authorized personnel and only in a confirmed emergency. Thus, both an intended criminal act on the part of a crew member as well as hijacking of the airplane by seizure of the cockpit by a non-crew member can be counteracted reliably. The overall system proposed to solve this problem meets very high demands regarding availability and integrity.

Reference numerals in the description and drawings serve only to improve an understanding of the invention and should not restrict the scope of protection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

They denote:
1 airplane
1' airplane
2 ground station
3 data transmission system
10 cockpit door
11 door unlock mechanism
12 request device
12' input device
13 signal transmitting unit
14 image capture unit
15 image capture unit
16 image transmitting unit
17 receiving unit
19 on-board computer
20 receiving station
21 command central
22 transmitting unit
30 satellite network
31 satellite
31' transmitter
32 satellite
32' transmitter
C cockpit
P passenger cabin
a door unlock request signal
b image signal
c door unlock signal

The invention claimed is:

1. An interactive system for unlocking a locked cockpit door of an airplane, the interactive system comprising:
at least one ground station, and
at least one data transmission system for transmitting data between a ground station and the airplane, wherein a signal for actuating a door unlock mechanism of the cockpit door can be transmitted from the ground station to the airplane,
an on-board computer in the airplane;
a door unlock request unit provided in a passenger cabin of the airplane to generate a door unlock request signal, the door unlock request unit having an input device configured for a crew member, who has a public encryption key, to sign a door unlock request;
a signal transmitting unit for the door unlock request signal in the airplane;
at least one image capture unit in at least one of the passenger cabin and a cockpit of the airplane and an image transmitting unit in the airplane for transmitting detected images to the ground station;
a receiving unit for receiving a door unlock signal in the airplane from the at least one ground station;

the on-board computer in the airplane being configured to receive the door unlock signal from the receiving unit, and to activate the door unlock mechanism of the cockpit door;

the at least one ground station being connected to at least one receiving station for door unlock request signals and image signals emitted by airplanes, the at least one ground station being equipped with a generating and signature unit for door unlock signals that utilizes a secret key of the ground station and the public key of the crew member initiating the unlock request to encrypt the door unlock signal, and the at least one ground station being provided with or connected to at least one transmitting unit for encrypted door unlock signals.

2. The interactive system according to claim 1, wherein the door unlock request unit, the signals transmitting unit, the at least one image capture unit, the image transmitting unit, the receiving unit for receiving a door unlock signal, the on-board computer responsible for unlocking the cockpit door and the door unlock mechanism cannot be turned off from the cockpit.

3. The interactive system according to claim 1, wherein the door unlock request unit, the signals transmitting unit, the at least one image capture unit, the image transmitting unit, the receiving unit for receiving a door unlock signal, the on-board computer responsible for unlocking the cockpit door and the door unlock mechanism cannot be turned off.

4. The interactive system according to claim 1, wherein the data transmission system includes a satellite network between the ground station and the airplane.

5. The interactive system according to claim 1, wherein the data transmission system is autonomous and independent, between the ground station and the airplane, of other communications equipment between the airplane and the ground.

6. The interactive system according to claim 1, wherein the door unlock request unit includes an input device for input of a personal authentication key into the on-board computer of the airplane responsible for unlocking the cockpit door;

the on-board computer that is responsible for unlocking the cockpit door is configured to authenticate a received signed door unlock signal, and the at least one ground station is equipped with a verification unit for the received door unlock request signals and with a generation and signature unit for the door unlock signals.

7. A method for unlocking a locked cockpit door of an airplane with an interactive system, wherein the cockpit door, delineating a cockpit from a passenger cabin, is unlocked on the basis of an unlock signal emitted by a ground station, comprising the following steps:

a) receiving, by the system, the input of a personal authentication key of a first crew member of the airplane crew, comprising a secret key and a passphrase for securing the secret key, into an input device in the passenger cabin by a first crew member of the airplane crew, wherein the personal authentication key that is input is sent to an on-board computer of the airplane, which is responsible for unlocking the cockpit door, thereby triggering an image transmission command;

b) transmitting, by the system, recorded images and/or live images that are being or have been recorded by at least one image capture unit in the passenger cabin and/or in the cockpit of the airplane to a ground station;

c) transmitting, by the system, a door unlock request signal and a personal identification code of the first crew member from the passenger cabin to the ground station;

d) verifying, by the system, the personal identification code, the transmitted images and flight information data in the ground station for deviations;

e) if no deviations are found, generating, by the system, an authenticated door unlock signal using a public key of the first crew member stored in a memory of the ground station and a secret key of the ground station as signatures for the door unlock signal;

f) sending, by the system, the signed door unlock signal from the ground station to the airplane and receiving the signed door unlock signal by a receiver of the airplane;

g) forwarding, by the system, the signed door unlock signal from the receiver on the airplane and to the on-board computer of the airplane responsible for unlocking the cockpit door;

h) verifying, by the system, the signatures of the signed door unlock signal, namely
using the secret key of the first crew member, and
using a public key of the ground station stored on board the airplane;

i) unlocking and opening the cockpit door, by the system, as long as verification of signatures of the door unlock signal has not revealed any errors.

8. The method according to claim 7, wherein the receiving of the input of a personal authentication key into the input device in step a) must additionally include the receiving of the input of a personal authentication key by at least one additional crew member of the airplane crew;

in step c), a personal identification code of the additional crew member is transmitted, by the system, from the passenger cabin to the ground station;

the generation of the signed door unlock signal in step e) takes place, by the system, by also using a public key of the additional crew member; and in step h) the personal authentication key of the additional crew member is also verified, by the system.

9. The method according to claim 7, wherein, in step d) a verbal query of the status information from the actual airplane pilot of the airplane is additionally carried out from the ground station.

10. The method according to claim 7, wherein the transmission of the signed door unlock signal from the ground station, by the system, in step f) takes place at a standardized frequency as a radio signal so that the signed door unlock signal is received by all airplanes that are in the reception area and are equipped with a suitable receiver.

11. An interactive system for unlocking a locked cockpit door of an airplane, the interactive system comprising:
at least one ground station, and
at least one data transmission system for transmitting data between a ground station and the airplane, wherein a signal for actuating a door unlock mechanism of the cockpit door can be transmitted from the ground station to the airplane,
an on-board computer in the airplane;
a door unlock request unit provided in a passenger cabin of the airplane to generate a door unlock request signal, the door unlock request unit having an input device configured for a crew member to sign a door unlock request by using a personal identification code;

a signal transmitting unit for the door unlock request signal and crew member personal identification code in the airplane;

at least one image capture unit in at least one of the passenger cabin and a cockpit of the airplane and an image transmitting unit in the airplane for transmitting detected images to the ground station;

a receiving unit for receiving a door unlock signal in the airplane from the at least one ground station;

the on-board computer in the airplane being configured to receive the door unlock signal from the receiving unit, and to activate the door unlock mechanism of the cockpit door;

the at least one ground station being connected to at least one receiving station for door unlock request signals, crew member personal identification codes, and image signals emitted by airplanes, the at least one ground station being equipped with a verification unit for the received crew member personal identification code to verify that the personal identification code belongs to a current crew member of the airplane, and with a generating unit for door unlock signals, and the at least one ground station being provided with or connected to at least one transmitting unit for door unlock signals.

12. The interactive system according to claim 1, wherein the door unlock request input device is configured for a crew member to sign a door unlock request by using a personal identification code, the signal transmitting unit for the door unlock request signal is also configured to transmit the crew member personal identification code, and the at least one ground station is equipped with a verification unit for the received crew member personal identification code to verify that the personal identification code belongs to a current crew member of the airplane.

13. The interactive system according to claim 1, wherein the at least one ground station is configured to verify flight information data for deviations from predetermined flight information.

14. The interactive system according to claim 11, wherein the at least one ground station is configured to verify flight information data for deviations from predetermined flight information.

\* \* \* \* \*